United States Patent
Bricaud et al.

[11] Patent Number: 5,980,323
[45] Date of Patent: *Nov. 9, 1999

[54] SMART CARD CONNECTOR

[75] Inventors: Herve Guy Bricaud, Dole; Bernard Juret, Crissen, both of France

[73] Assignee: ITT Manufacturing Enterprises, Inc., Wilmington, Del.

[*] Notice: This patent is subject to a terminal disclaimer.

[21] Appl. No.: 08/888,435

[22] Filed: Jul. 7, 1997

Related U.S. Application Data

[63] Continuation-in-part of application No. 08/573,762, filed as application No. PCT/FR94/01532, Dec. 26, 1994, abandoned.

[30] Foreign Application Priority Data

Dec. 24, 1993 [FR] France ................................. 93 15633

[51] Int. Cl.⁶ .................................................. H01R 13/44
[52] U.S. Cl. .............................. 439/630; 439/60; 439/862
[58] Field of Search .............................. 439/630, 60, 751, 439/733.1, 741, 862, 852, 861, 858, 660

[56] References Cited

U.S. PATENT DOCUMENTS

| | | | |
|---|---|---|---|
| 4,623,207 | 11/1986 | Sasaki et al. | 439/631 |
| 5,154,644 | 10/1992 | Kiat-Hup et al. | 439/630 |
| 5,259,793 | 11/1993 | Yamada et al. | 439/751 |
| 5,271,740 | 12/1993 | Endo et al. | 439/852 |
| 5,338,231 | 8/1994 | Wilhite | 439/676 |
| 5,425,651 | 6/1995 | Thrush et al. | 439/630 |
| 5,746,607 | 5/1998 | Bricaud et al. | 439/630 |
| 5,800,200 | 9/1998 | Bricaud et al. | 439/630 |

*Primary Examiner*—Paula Bradley
*Assistant Examiner*—Tho D. Ta
*Attorney, Agent, or Firm*—Thomas L. Peterson

[57] ABSTRACT

An electrical connector (10, FIG. 5) is provided for connecting to a smart card C. The connector includes a two-piece molded plastic frame (11) having a horizontal planar top face (76), and also includes a plurality of resilient sheet metal electrical contacts (16). Each contact has a curved card-engaging part (30), a fixed part (46) that is fixed to the frame, and a central part (38) for connecting the card-engaging part to the fixed part. The central part has a first branch (44) forming a U-shaped fold of about 150°, a second branch (42) extending at an upward-rearward (U,R) incline from the fold to the card-engaging part, and a lower branch (40) that extends rearwardly from the fold to the fixed part. The branches (40,42,44) of the central part are each downwardly deflectable to enable easy deflection of the card-engaging part in a contact of small longitudinal (M) length. Two rows of contacts (16, 16X) are positioned so their folds (44) lie adjacent to a longitudinal centerplane (P) of the connector, to save room. The fixed parts 46 of the contacts have harpoon-shaped foots 62 laterally spaced from the rest of the contact.

18 Claims, 4 Drawing Sheets

SMART CARD CONNECTOR

CROSS REFERENCE

This is a continuation-in-part of U.S. Ser. No. 08/513,762 filed Jun. 7, 1996 and now abandoned, which is a 37 USC 371 application of PCT/FR94/01532 filed Dec. 26, 1994, which is based on French patent application 93/15633 filed Dec. 24, 1993.

BACKGROUND OF THE INVENTION

The present invention relates to an electrical connector for connection to a "smart card", which is an electronic memory card with contact pads on one of its faces. The invention relates more particularly to a connector of the type that includes a molded plastic frame having a horizontal planar face and a plurality of electrical contacts with curved ends projecting above the frame face. Such contacts each have a part fixed to the frame and a central portion connecting the card-contacting end to the fixed part. Two laterally-extending rows of contacts are mounted on the housing.

In one design, shown in French document FR-A-2,638,293, each contact is in the form of a beam. One end of the beam is embedded in the frame and the beam extends longitudinally therefrom to a curved card-engaging end. This design requires considerable contact length to provide sufficient resilience to deflect downwardly when engaging a card. In that document and document FR-A-2,587,549, the fixed part of each contact is fixed by overmolding insulating material of the frame around the contact. Such fixing is expensive because it requires the provision of means for holding the contact in place in the mold, during molding.

SUMMARY OF THE INVENTION

In accordance with one embodiment of the present invention, an electrical connector is provided, which is of short longitudinal (forward and rearward) length and which is fixed to a frame in a low cost construction. The connector has at least one row of contacts, and preferably has both forward and rearward rows of contacts that lie respectively rearward and forward of a vertical centerplane P. Each contact has a card-engaging end for engaging a smart card, a fixing part which is fixed to the connector frame, and a central part that connects them. The central part of each rearward contact has a first branch forming a fold of about 150° at its forward end, a second branch that extends at an upward-rearward incline of about 30° from the fold to the card-engaging part, and a third branch that extends primarily horizontally and in a rearward direction from the fold to the fixed part. The contacts of the forward row are of the same construction but are turned 180° about vertical axes. The folds at the two rows of contacts lie closer to the vertical centerplane P than do other parts of the contacts. The folds have convex faces that face the vertical centerplane P.

Each contact is of the type that is cut from sheet metal and then bent, or folded, to provide uniform thickness and high resilience at the fold. The branches of each contact central part are free to deflect downwardly, to provide high resilience in a contact of small longitudinal length. The fixed part of the contact has a harpoon-shaped foot that is laterally offset from the central part of the contact. The foot lies in a frame slot that is formed by walls extending alternately upward and downward from the slot.

The novel features of the invention are set forth with particularity in the appended claims. The invention will be best understood from the following description when read in conjunction with the accompanying drawings.

DESCRIPTION OF THE PREFERRED EMBODIMENTS

Figure 5:
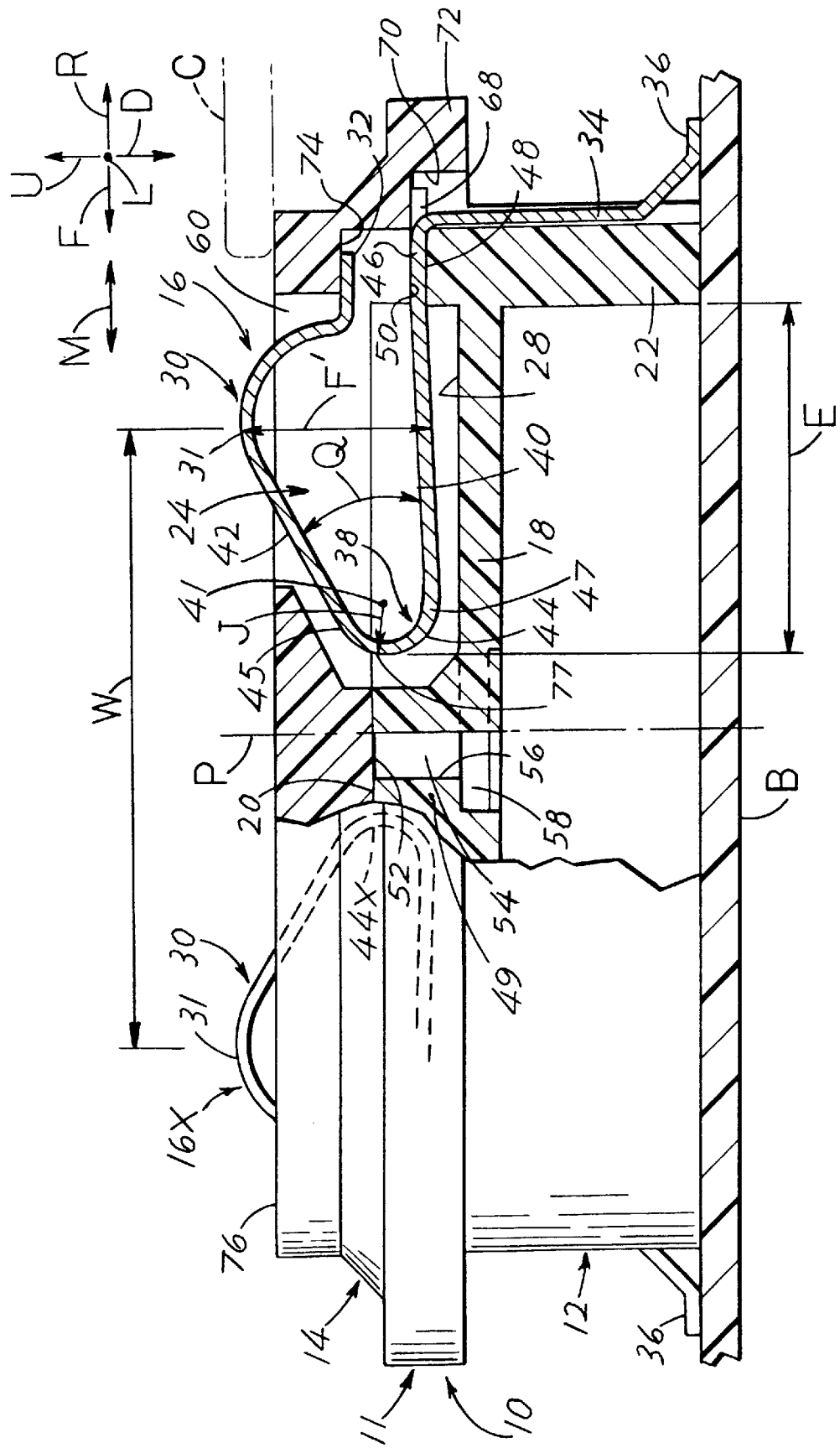
FIG. 5 is a sectional view taken on line 5—5 of FIG. 4.

FIG. 5 shows a connector 10 that includes a housing or frame 11 and two rows of contacts 16, 16X mounted on the frame. The frame includes a support 12 and a cover 14, each of molded insulative, or dielectric, plastic. The support 12 includes a largely horizontal plate 18 that has an upper face 20 and generally rectangular side walls 22. The upper face 20 has two rows of recesses that form portions of cavities 24 that receive parts of the contacts.

The connector is generally symmetrical about a vertical longitudinal mid-plane P that may be said to face in forward and rearward directions. The frame has two-laterally extending rows of cavities 24, one lying rearward of the other for holding the two row of contacts 16, 16X. Forward and rearward directions are indicated by arrows F,R which are parallel to a longitudinal direction M and perpendicular to the lateral direction L and up and down directions U, D.

Each cavity 24 is in the form of a notch having parallel edges or faces 26 (FIG. 4) and having a horizontally-extending bottom 28 (FIG. 5). Each cavity 24 is designed to receive one of the contacts such as 16. Each contact is formed of resilient sheet metal that has been cut from a larger sheet and bent to form the shape shown in FIG. 1A.

Each contact 16 includes a card-engaging curved end 30 for engaging a corresponding pad A on the card C. Each contact has a terminal portion 34 that can connect to a circuit X of a read/write device that includes the connector 10.

The card-engaging end 30 of each contact has a tip or nose 32 extending in a horizontal plane. The end 30 has an upper surface S that is generally convex but that has a concave location 33 that leads to the tip 32. As shown in FIG. 5, the tip 32 limits how high the end 30 projects above an upper horizontal face 76 of the frame.

The terminal 34 of each contact extends downwardly from the fixed portion 46 along the frame sidewall 22, with the terminal terminating in a lead 36 that is bent to extend largely horizontally to permit soldering to a circuit board trace. That is, the terminals can be surface mounted to a circuit board B.

The card-engaging end 30 and the fixed part 46 of the contact are connected together by a hairpin-shaped central part 38. The central part 38 of each contact includes a forward first branch 44 that forms a bend or fold of more than 90° about a lateral axis 41, with upper and lower fold ends 45, 47. The fold of more than 90° refers to the angle of folding from an original planar orientation wherein the fold ends 45, 47 are coplanar, with the inside angle Q of the fold (about the point 49) being less than 90°. The central part 38 has a second branch 42 that extends at an upward-rearward incline from the fold upper end 45 to the card-engaging part 30. The central part also has a third branch 40 that extends rearwardly and primarily horizontally (preferable within 15° and more preferably within 5° of the horizontal) from the fold lower end to the fixing part 46. The fold 44 and at least the forward halves of the branches 40, 42 are free to deflect downwardly when a card presses down against the surface of the contact end 30. Applicant prefers a fold 44 of about 150°, so the second branch 42 extends at an incline of about 30° from the horizontal when the third branch is horizontal.

When the contact end 30 is depressed by a card, both the tip 32 and branch 40 can deflect downwardly. During such downward deflection, bending occurs in the central part 38, along its branches 40, 42, 44. Considerable bending occurs at the fold 44 resulting in the branches 40, 42 becoming more parallel. All of the resilience is obtaining in a contact 16 of small length in the longitudinal direction M, due to the fold 44 resulting in two branches 40, 42 that can each bend in addition to bending of the fold 44. An important advantage of obtaining such resilience in a connector of small longitudinal length is that it enables the connector to have a short longitudinal length, so it occupies only a small area of the circuit board B. That is, the distance between the leads 36 of the rear and front connectors 16, 16X is relatively small. For a read/write device of limited length, this leaves more of the circuit board available for circuitry that processes signals. In surface mount applications, there should be unrestricted access to locations where the leads 36 are soldered to surface traces on the circuit board, so the solder joints can be observed for quality control and repaired.

In a connector that applicant has designed (longitudinal length of about 15.5 mm), where the longitudinal distance between the card-engaging locations 31 of the two rows of connectors 16, 16X was set at 7.62 mm (an ISO 7816-1, 7816-2, and 7816-3 standard), the central part 38 of the contact had a length E of 4.3 mm and a height F' of 2.5 mm. The fold 44 had a relatively large radius of curvature J of 0.7 mm which is more than 20% of the height F' of the central portion. This facilitates predictable bending of the fold 44 (e.g., from 150° to 170°) as the contact is depressed. The contact was formed of sheet metal having a thickness of 0.17 mm at the fixed part 46 and terminal portion 34, and a thickness H of 0.14 mm along the central part 38 (and the central part 38A in FIG. 6). The card-engaging part 30 and fold 44 formed a strip of a width J' of 0.6 mm which is a plurality of times its thickness.

The fixed part 46 of each contact is rigidly fixed to the frame. To accomplish this, the part 46 is compressed between a horizontal surface portion 48 (FIG. 5) of the support 12 and a corresponding surface portion 50 of the cover 14. The cover 14 is fixed to the support 12 by hot crimping two studs 54 of the cover, with the studs extending downwardly from the cover lower face 52 into two corresponding holes 56 formed in the upper wall 18 of the support 12. By hot crimping the heads 58 of the studs 54, the cover 14 is firmly fixed to the support and clamps the fixing parts 46 of the contacts to fix them in place.

The cover 14 includes two rows of openings 60 through which the card-engaging contact ends 30 project.

Figure 1:
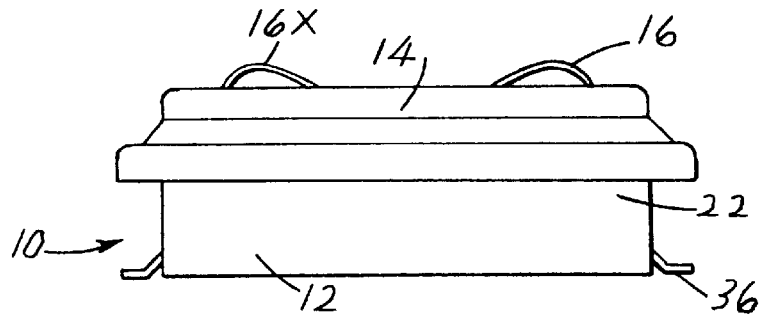
FIG. 1 is a side elevation view of a connector of the present invention.
Figure 2:
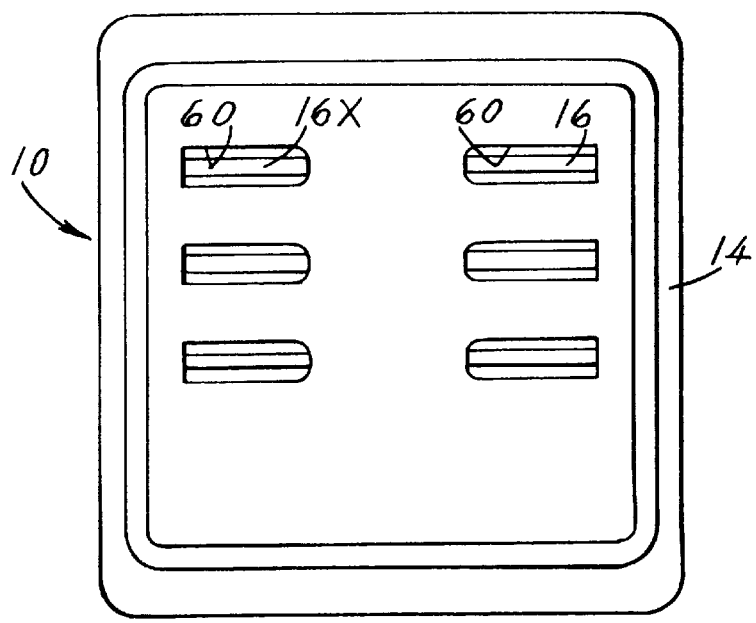
FIG. 2 is a plan view of the connector of FIG. 1.
Figure 3:
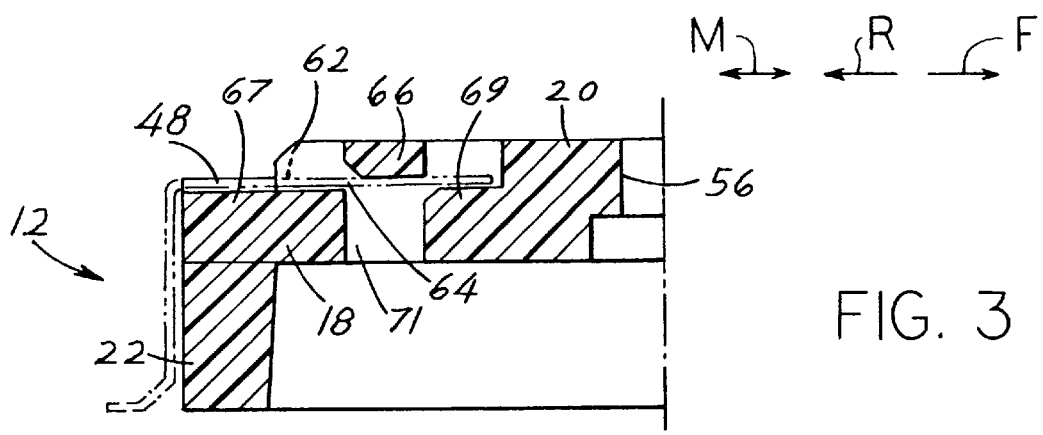
FIG. 3 is a partial sectional side view taken on line 3—3 of FIG. 4.
Figure 4:
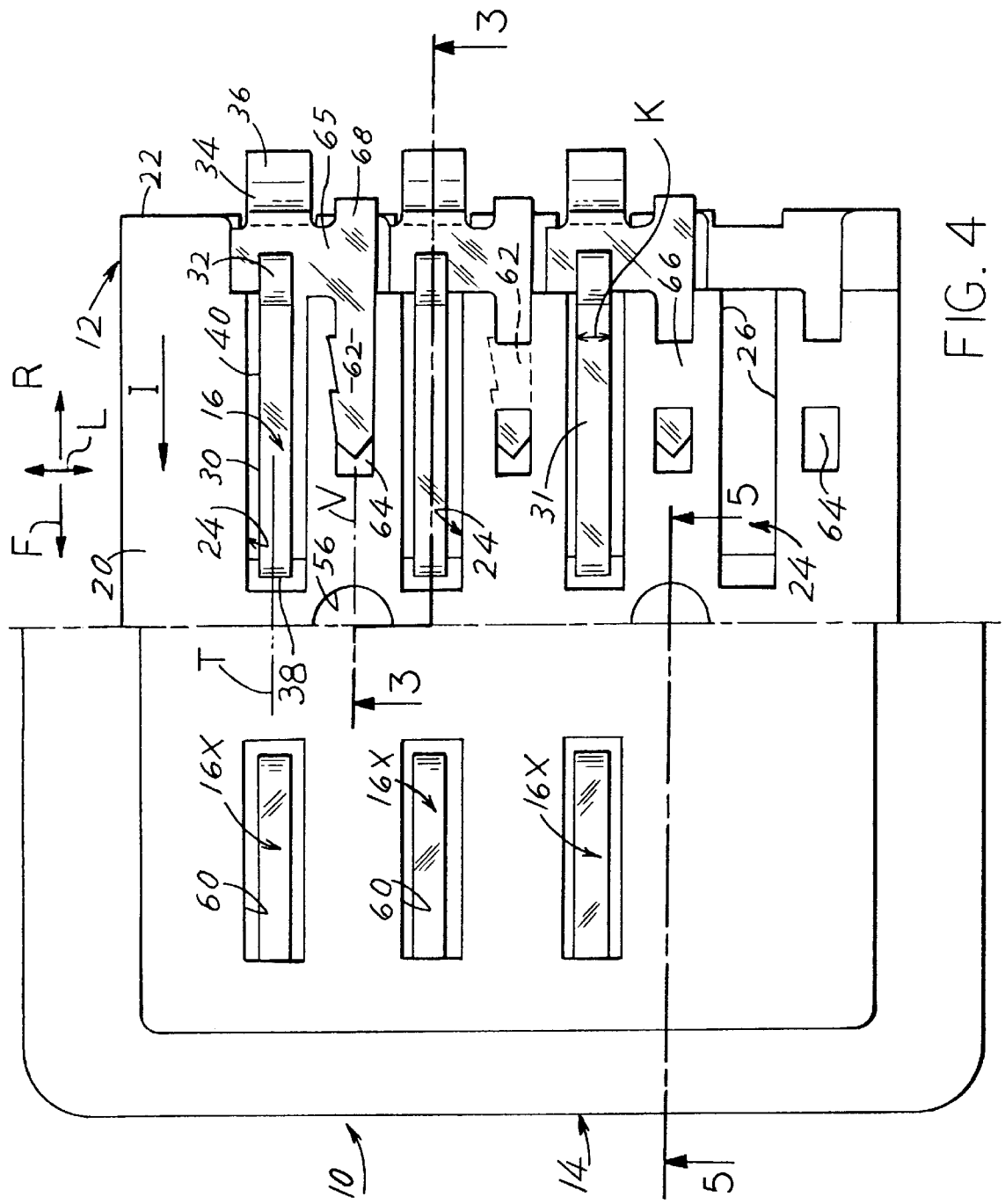
FIG. 4 is a view taken from above, of the connector of FIGS. 1–3, with the cover being cut-away at the right half of the figure and being intact at the left half of the figure.

In the embodiment illustrated in FIGS. 1–5, the connector 10 has eight cavities but only six contacts. Prior to installing the cover 14, each contact 16 of the rearmost row is installed in the support 12 by longitudinal insertion in the forward direction F (FIG. 4). During such insertion, a harpoon-shaped lateral catching foot 62 on each contact 16 is forcibly inserted into a corresponding slot 64 (FIG. 3) in the support 12. Each catching foot 62 extends substantially parallel to the third branch 40 (FIG. 4), to which it is connected by a crosspiece 65. While most of a contact has been bent after cutting from a sheet, to lie in a single vertical lateral plane T, the foot 62 lies in a parallel but spaced vertical lateral plane V. The planes T, V are vertical planes that are normal to the lateral direction L. The crosspiece 65 connects the contact portions that lie in the two planes. According to ISO 7816-1/-2/-3 standards, the card-engaging locations 31 of a row of contacts are laterally (L) spaced by 2.54 mm. Applicant constructs each contacts so its width K at the third branch 40 is 0.8 mm. this leaves considerable space (1.74 mm lateral length) between contacts, which applicant uses to hold the foots 62.

Figure 1A:
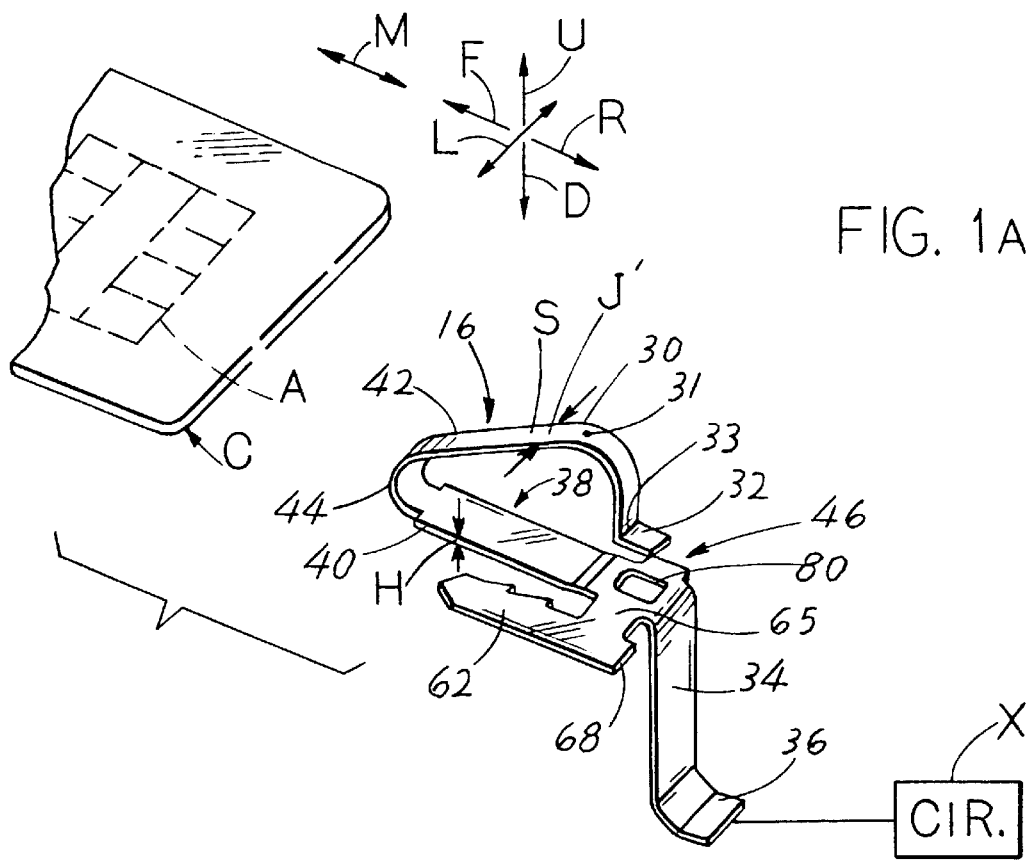
FIG. 1A is an isometric view of the contact of the connector of FIG. 1, showing how the contact is connected to a circuit and can be connected to pads on a smart card.

As shown in FIG. 1A, the card-engaging location 31 is moved downwardly by a card. The foot 62 is not located directly under the card-engaging location 31, but is laterally offset from it. This is partly due to the contact being bent after being cut from sheet metal rather than being cut in its final shape.

As shown in FIG. 3, each slot 64 has an upward wall 66 that extends up from the slot that holds the foot 62. Each slot also includes a pair of downward walls 67, 69 that extend downwardly from the slot. The up and down walls alternate, with a gap 71 between the two downward walls. This construction facilitates molding of the support 12 with a slot. It also can help hold the foot by having the foot undergo a slight bending wherein its upper face is concave, during full insertion into the slot.

FIG. 1A shows that each catching foot 62 includes a projecting heel 68 that extends laterally rearward beyond the connection end 34 of the contact 16 opposite a face 70 (FIG. 5) of a peripheral flange 72 on the cover. This prevents accidental lateral escape of the contact.

As shown in FIG. 5, when the connector is fully assembled but the card is not yet installed, the nose 32 of the contact presses resiliently against a downwardly-facing surface 74 formed on the lower face 52 of the cover 14. This defines a precise rest position of the card-engaging end 30 of the contact.

The cover 14 thus keeps all contacts slightly resiliently prestressed in precise positions. This design has the advantage of making it possible to vary the force which presses the contacts against the smart card, depending upon the exact geometry of bending of the central part 38 while precisely controlling the amount of upward projection of the card contact end 30 above the upper face 76 of the cover 14.

The contacts 16, 16X of the rearward and forward rows are substantially identical, except that they are turned 180° about vertical axes from one another. The folds 44, 44X of the two row of contacts 16, 16A have their convex faces facing the longitudinal centerplane P of the connector, and lying closer thereto than the rest of each contact. The longitudinal centerplane P is a vertical centerplane that is normal to the longitudinal directions F, R. As discussed above, ISO 7816-1/-2/-3 standards require a longitudinal spacing W of the two rows of contacts (at their contact locations 31) of 7.62 mm. Applicant is able to construct the contacts so the longitudinal distance (of about 3 mm) between the tip of the fold 44 and location 31 is less than half of 7.62 mm. Applicant places the folds in the space W between contact tips to utilize this space to minimize the longitudinal length of the connector. The convex faces 77 of the rearmost row of contacts 16 face the convex faces of the frontmost row of contacts (which also can be referred to as "contact elements") 16X.

Figure 6:
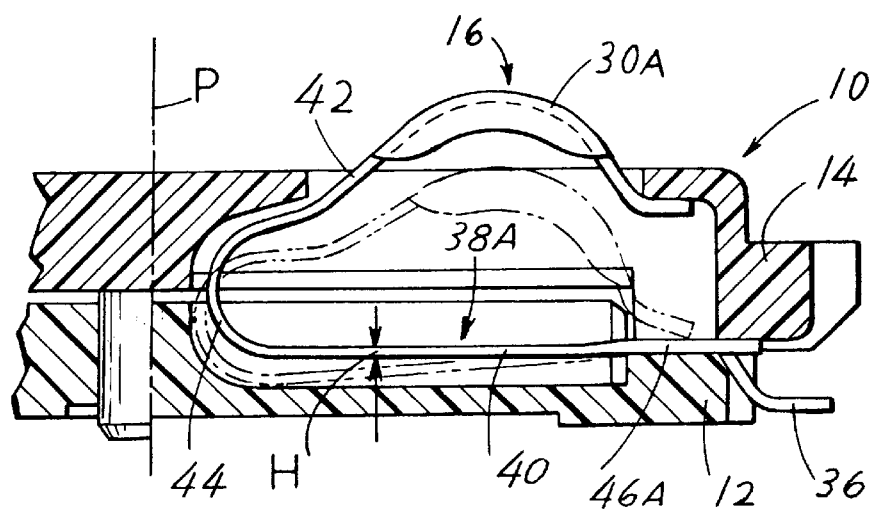
FIG. 6 is a partial sectional view of a connector of another embodiment of the invention.

In FIG. 6, which shows another embodiment of the invention, a section of the contact which extends from the fixed portion 46A up to the curve projecting card-engaging portion 30A is thinned and thus has a reduced thickness H with respect to the thickness of the metal strip from which the contact is produced by cutting and folding. The reduced thickness increases the contact resilience and enables an increase in resilient bending of each contact despite the small total height of the connector. Thinning of the intermediate section is achieve by a local facewise compression, before cutting out the contacts which work-hardens them. In order to further increase bending resilience it is possible to provide a hole, shown at 80 in FIG. 1A, in the fixed part 46 of the contact with the hole positioned to receive the free end at the nose 32 when the contact is fully depressed.

In the illustrated connectors the design of the frame provides good electrical isolation of the contacts from one another. Such isolation is achieved by providing walls 28 (FIG. 5) at the bottom and laterally opposite faces 26 (FIG. 4) of each cavity, and by providing the slits or openings 60 in the cover 14 to pass each card-engaging end of a contact.

While terms such as "horizontal", "vertical", etc. have been used to describe the invention as illustrated, it should be understood that the connector can be used in any orientation with respect to the Earth.

Thus, the invention provides a connector of small longitudinal length and small height, which has highly resilient contacts for engaging cards and with the contacts being easily installed. Each contact has a card-engaging end and a fixing part, and has a central part extending between them. The central part has a front branch forming a bend or fold of more than 90° and preferably about 150°. The central part also includes a second branch extending at a rearward-upward incline to the card-engaging end (for the rearmost row of contacts), and a primarily horizontal third branch extending from the fold rearwardly to the fixing part. The fold is free to deflect downwardly and bend. This results in high resilience for a connector of small longitudinal length and therefore small footprint on a circuit board. The folds of the forward and rearward rows of contacts lie closer than other parts of the two rows of contacts, with the convex surfaces of folds facing a longitudinal centerplane of the connector. Each contact can be held by a harpoon-shaped foot that lies below the level of the card-engaging part. The foot is received in a slot of the frame. The slot can include walls that extend both upwardly and downwardly from the slot, such as by two downwardly-extending walls with a gap between them, and with an upwardly-extending wall that extends upwardly above the gap.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An electrical connector for connecting pads on a smart card to a signal processing circuit, comprising:

an insulative frame (11) with a horizontal face (76) against which the card can be moved;

a plurality of contacts (16, 16x) extending in first and second laterally-extending rows, with each contact having a card-engaging part (30) projecting above said face, a terminal part (34) for connection to the signal processing circuit, a fixed part (46) fixed to said frame and coupled to said terminal part, and a central part (38) lying in said frame and extending between said card-engaging part and said fixed part;

said central part (38) of said contacts of said first row each having a forward first branch (44) with a U-shaped fold of more than 90° from an in-line orientation with said fold having upper and lower fold ends (45,47), a second branch (42) extending at a rearward-upward incline from said upper fold end to said card-engaging part, and a third branch (40) extending primarily rearwardly from said lower fold end to said fixed part;

said contacts of said second row each being similar to those of said first row but turned 180° about a vertical axis from the orientation of the contacts of said first row and lying forward of the contacts of said first row, with said forward branches (44,44x) of said contacts of said rows having fold convex surfaces facing in opposite directions to minimize a dimension of said connector in forward and rearward directions.

2. The electrical connector described in claim 1 wherein:

said frame has a vertical longitudinal centerplane (P) that is normal to said forward and rearward directions, said rows are arranged with the central parts of contacts of said second row lying directly forward of the central parts of contacts of said first row;

the folds of the contacts of said first row have convex surfaces that face forwardly toward said centerplane, and the folds of the contacts of said second row have convex surfaces that face rearwardly toward said centerplane.

3. The electrical connector described in claim 1 wherein:

each of said contacts is formed of a strip of sheet metal having a width that is greater than its thickness and having bends that are each formed by bending a portion of the strip out of the plane of an adjacent portion of the sheet metal.

4. The electrical connector described in claim 1 wherein;

said forward branch and at least forward portions of said second and third branches of each of said contacts being free to deflect downwardly and bend as said card-engaging part is initially downwardly deflected.

5. The electrical connector described in claim 1 wherein:

each of said contacts has a nose (32) at the front end of said card-engaging part, and said contact has a hole lying at said fixed part and positioned to receive said nose when said card-engaging part is downwardly deflected.

6. The electrical connector described in claim 1 wherein:

each of said contacts is formed of sheet metal, with said fixed part (46, 46A) having a first thickness and said central part having a smaller second thickness (H) formed by local facewise compression to produce increased resilience of said central part.

7. An electrical connector for connecting pads on a smart card to a signal processing circuit, comprising:

an insulative frame (11) with a horizontal face (76) against which the card can be moved;

a plurality of contacts (16) that are each formed of a strip of sheet metal having a width that is greater than its thickness and having bends each formed by bending a portion of the strip out of the plane of an adjacent portion of the sheet metal, with each contact having a card-engaging part (30) projecting above said face, a terminal part (34) for connection to the signal processing circuit, a fixed part (46) fixed to said frame and coupled to said terminal part, and a central part (38) lying in said frame and extending between said card-engaging part and said fixed part;

said central part (38) having a forward first branch with a U-shaped fold (44) of more than 90° from an in-line orientation with said fold having upper and lower fold ends (45,47) that extend at an angle of less than 90° to each other, a largely straight second branch (42) extending at a rearward-upward incline from said upper fold end to said card-engaging part, and a largely straight third branch (40) extending primarily rearwardly from said lower fold end to said fixed part, with all of said U-shaped fold, and at least forward portions of said second and third branches being free to deflect downwardly and bend as said card-engaging part is initially downwardly deflected.

8. The card connector described in claim 7 wherein:

said central part has a predetermined height (F') and the outside of said fold has a predetermined radius of curvature (J) which is at least 20% of said height.

9. The connector described in claim 7 wherein:

said fold extends by an angle of about 150°, with said third branch extending about parallel to said horizontal face of said frame and with said second branch extending at an incline of about 30° to said horizontal face.

10. The connector described in claim 7 wherein:

said fixed portion includes a foot (62) in the form of a harpoon and said frame includes a longitudinally extending slot (64) that receives said foot;

said contact-engaging part and said central part (38) both lie in a first vertical plane (T) with said card-engaging part (30) being downwardly deflectable in said first plane, while said foot lies in a second plane (V) that is laterally spaced from said first plane.

11. The connector described in claim 7 wherein:

said fixed portion includes a foot (62) in the form of a harpoon, which is laterally offset from said third branch of said central part;

said frame includes slot walls forming a longitudinally-extending slot (64) that receives said foot, said slot walls including alternate upwardly (66) and downwardly (67,69) extending walls that respectively extend upwardly from said slot and downwardly from said slot, with said slot walls being longitudinally spaced along said slot and engaging said foot.

12. The connector described in claim 7 wherein:

said plurality of contacts (16) extend in a first laterally-extending row, and including a second row of contact elements (16X) which is forwardly spaced from said first row, and a vertical centerplane which lies between said first and second rows, and with the folds (44) of said contacts and of said contact elements facing said vertical centerplane.

13. An electrical connector for connecting to pads on a smart card, comprising:

a molded frame having a horizontal face (76);

a laterally-extending row of contacts (16) mounted on said frame; each contact having a fixed part (46) that is fixed to said frame;

each contact having a card-engaging part (30) that projects above said horizontal face;

each contact having a central part (38) with a forward branch (44) that is curved about a laterally-extending axis (41), a second branch (42) extending at an upward-rearward incline to said card-engaging part, and a third branch (40) that extends primarily horizontally to said fixed part;

said forward branch is curved by about 150°, and said central part, including at least part of said third branch, is free to deflect downwardly relative to said frame.

14. An electrical connector for connecting to a smart card that is constructed in accordance with ISO 7816-1/-2/-3 standards and that has a face with a laterally-extending row of contact pads (A) with said pads spaced at a pitch of substantially 2.54 mm along said row, the connector including a dielectric molded frame (11) having a horizontal upper face (76) and a laterally (L) extending row of contact-receiving cavities (24) opening to said upper face, and said connector includes a plurality of bent sheet metal contacts (16) that lie largely in said cavities and that are bent to have upper card-engaging parts (30) projecting above said face and being downwardly deflectable and fixed parts (46) that are fixed to said frame and central parts (38) connecting said upper parts and said fixed parts, wherein:

said frame has a plurality of foot-receiving slots (64) that each lies laterally between two of said cavities of said laterally-extending row, and each of said contacts has a foot (62) lying in one of said foot-receiving slots and forming a portion of the fixed part of the contact.

15. The connector described in claim 14 where:

said frame has walls forming each of said foot-receiving slot where said walls form alternate upwardly (66) and downwardly (67, 69) extending walls that respectively extend upward from said slot and downward from said slot, with a gap (71) between two of said walls that extend in the same vertical direction from said slot.

16. A smart card-engaging electrical connector that has a frame (11) with a horizontal upwardly-facing face and a longitudinal centerplane (P) that faces in forward and rearward directions, said connector including forward and rearward rows of contacts lying respectively forward and rearward of said centerplane with each row extending in a lateral direction that is perpendicular to said forward and rearward directions, wherein:

each of said contact in said rearward row has a fixed part (46) that is fixed to said frame, a card-engaging part (30) that projects above said upwardly-facing face, and a center part (38) that extends between said fixed part and said card-engaging part;

said center part of each of said contacts in said rearward row includes a fold (44) where said contact is bent by more than 90° with said fold having upper and lower fold ends (45, 47), a second branch (42) that extends at a rearward-upward incline from said fold upper end to said card-engaging part, and a third branch (40) extending rearwardly from said fold lower end to said fixing part;

said fold having a convex surface that faces said centerplane.

17. The connector described in claim 16 wherein:

said contacts of said forward row are substantially identical to those of said rearward row, except that they are turned 180° about a vertical axis from each other, with the convex surfaces of the folds of contacts of said rearward and forward rows each facing said centerplane.

18. The connector described in claim 16 wherein:

said frame has rearward and forward ends and said rearward and forward contacts have surface mount terminals (36) at said rearward and forward ends, respectively, with each terminal extending from a corresponding fixing part.

\* \* \* \* \*